US012649828B2

(12) United States Patent
Woznicka et al.

(10) Patent No.: US 12,649,828 B2
(45) Date of Patent: Jun. 9, 2026

(54) PROCESS FOR THE PREPARATION OF HYDROXYL-FUNCTIONALIZED POLYETHER-POLYSILOXANE BLOCK COPOLYMERS

(71) Applicant: Henkel AG & Co. KGaA, Duesseldorf (DE)

(72) Inventors: Marta Woznicka, Rostock (DE); Swarup Ghosh, Rostock (DE); Marion Marquardt, Rostock (DE); Esteban Mejia, Rostock (DE); Udo Kragl, Kritzmow (DE); Christina Despotopoulou, Minneapolis, MN (US); Jan-Erik Damke, Dormagen (DE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 1125 days.

(21) Appl. No.: 17/075,482

(22) Filed: Oct. 20, 2020

(65) Prior Publication Data

US 2021/0040269 A1 Feb. 11, 2021

Related U.S. Application Data

(63) Continuation of application No. PCT/EP2019/059782, filed on Apr. 16, 2019.

(30) Foreign Application Priority Data

Apr. 25, 2018 (EP) .................................... 18169245

(51) Int. Cl.

*C08G 77/46* (2006.01)
*C08G 18/10* (2006.01)
*C08G 18/61* (2006.01)
*C08L 53/00* (2006.01)
*C08G 77/08* (2006.01)

(52) U.S. Cl.

CPC ............. *C08G 77/46* (2013.01); *C08G 18/10* (2013.01); *C08G 18/61* (2013.01); *C08L 53/005* (2013.01); *C08G 77/08* (2013.01)

(58) Field of Classification Search

CPC ...................................................... C08G 77/46
See application file for complete search history.

(56) References Cited

U.S. PATENT DOCUMENTS 2,491,843 A 12/1949 Wilcock
2,834,748 A 5/1958 Bailey et al.
3,268,561 A 8/1966 Peppel et al.
3,564,037 A 2/1971 Delaval et al.
3,723,491 A 3/1973 Rossmy et al.
4,618,703 A 10/1986 Thanawalla et al.
5,175,327 A 12/1992 Parkinson et al.
5,290,912 A * 3/1994 Watabe .............. C08G 65/2663 528/416
5,461,088 A 10/1995 Wolf et al.
5,536,883 A 7/1996 Le-Khac
5,625,023 A 4/1997 Chung et al.
5,696,192 A 12/1997 Harashima
5,767,323 A 6/1998 Televantos et al.
7,834,082 B2 11/2010 Haider et al.
8,283,422 B2 10/2012 Schubert et al.
8,779,079 B2 7/2014 Henning et al.
9,073,836 B2 7/2015 Klumpe et al.
9,085,591 B2 7/2015 Zhang et al.
9,458,286 B2 10/2016 Zander et al.
2003/0069389 A1 4/2003 Eleveld et al.
2003/0158449 A1 8/2003 Hofmann et al.
2004/0068021 A1 * 4/2004 Nodelman ......... C08G 18/6685 521/170
2004/0220430 A1 11/2004 Eleveld et al.
2005/0065383 A1 3/2005 Wehmeyer
2008/0167502 A1 7/2008 Bohres et al.
2008/0171829 A1 7/2008 Haider et al.
2008/0227923 A1 9/2008 Klein et al.
2009/0299025 A1 12/2009 O'Lenick et al.

(Continued)

FOREIGN PATENT DOCUMENTS

CN 101962444 A 2/2011
CN 102074736 A 5/2011
CN 102209744 A 10/2011
DE 102007012241 A1 9/2008
EP 0520426 A1 12/1992
EP 0643329 A2 3/1995
EP 0894108 B1 7/2001
JP H09202829 A 8/1997
WO 2011136389 A2 11/2011
WO 2012136657 A2 10/2012

OTHER PUBLICATIONS

Li et al., Study on synthesis of Si—C organosilicon foam stabilizers, Dept. of Chemistry and Chemical Engineering, Science & Technology in Chemical Industry, 2006, 14(3), pp. 13-14.
International Search Report for International PCT Patent Application No. PCT/EP2019/059782 dated May 13, 2019.
W. Noll, Chemie und Technologie der Silicone, Verlag Chemie, 1968, p. 321-323.
Duda, A. et al., Thermodynamics and Kinetics of Ring-Opening Polymerization in Handbook of Ring-Opening Polymerization, Wiley-VCH, Weinheim, Germany, (2009), pp. 1-51.

(Continued)

*Primary Examiner* — Margaret G Moore
(74) *Attorney, Agent, or Firm* — Mary K. Cameron

(57) ABSTRACT

The present invention is directed to a hydroxyl-functionalized polyether-polysiloxane block copolymer of the structure $A(\text{-}X\text{—}B)_n$
wherein: A represents said polysiloxane block;
B represents said polyether block;
X is a linker group characterized by including the moiety Si—C—C— of which said Si is the terminal silicon atom of the polysiloxane block A; and,
n is an integer of from 2 to 4,
said block copolymer being further characterized by a terminal unsaturation of less than 0.04 meq/g, preferably less than 0.03 meq/g and more preferably less than 0.025 meq/g and the method for producing thereof.

12 Claims, No Drawings

(56) References Cited

U.S. PATENT DOCUMENTS

| | | | |
|---|---|---|---|
| 2010/0168367 A1 | 7/2010 | Schubert et al. | |
| 2010/0324251 A1 | 12/2010 | O'Lenick et al. | |
| 2017/0283554 A1 | 10/2017 | Lobert et al. | |

OTHER PUBLICATIONS

Chojnowski, J. et al., Kinetically controlled siloxane ring-opening polymerization, J. Inorg. Organomet. Polym. (1991), vol. 1, pp. 299-323.

Nuyken et al., Ring-Opening Polymerization—An Introductory Review, Polymers 2013, 5, pp. 361-403.

Inter alia: Ullmann's Encyclopedia of Industrial Chemistry, 5th Edition (1994) vol. A25, pp. 747-817.

Kirk-Othmer Encyclopedia of Chemical Technology, 4th Edition (1997) vol. 23, pp. 477-541.

Tensid-Taschenbuch, 2nd Edition (1982), H. Stache (ed.), Carl Hanser Verlag, Munich.

Surfactant Science Series, vol. 1-74 (1967-1998) M. J. Schick (Ed.), Marcel Decker, New York.

J. L. Speier et al., J. Am. Chem. Soc. 1957, 79, p. 974.

A. J. Chalk et al., J. Am. Chem. Soc. 1965, 87, p. 16.

B. Marciniec, Hydrosilylation, vol. 1, Springer Netherlands, 2009.

J. Am. Chem. Soc. 71 (1949) 1152.

DIN 55672-1:2007-08.

DIN 53240-2.

DIN EN ISO 11909.

* cited by examiner

PROCESS FOR THE PREPARATION OF HYDROXYL-FUNCTIONALIZED POLYETHER-POLYSILOXANE BLOCK COPOLYMERS

FIELD

The present invention is directed to a process for the preparation of hydroxyl-functionalized polyether-polysiloxane block copolymers. More particularly, the present invention concerns a two-stage process for the preparation of said block copolymers, the first stage being constituted by the provision of a hydroxyalkyl-terminated polysiloxane and the second stage being constituted by the polymerization of at least alkylene oxide in the presence of said hydroxyalkyl-terminated polysiloxane as a starter compound. The present invention is further directed to the block copolymers obtained by the disclosed process, to the use of said block copolymers and to silylated polymers based on said block copolymers.

BACKGROUND

A number of classes of polyether-polysiloxane copolymers are known in technical literature. The suitability of each class of copolymer for a specific application depends on the structure of the polysiloxane and polyether units, their ratio and their arrangement relative to one another: it also depends strongly on the type of linkage between these units. In this regard, the linking of the units can be distinguished inter alia by Si—O—C bonding or by Si—C bonding.

Polysiloxane-polyether copolymers linked by Si—O—C bonds can be prepared by the reaction of hydroxyl (OH—) terminated polyethers with siloxanes containing halogen, hydroxyl, alkoxy or acetoxy groups, as described in W. Noll, *Chemie and Technologie der Silicone*, Verlag Chemie, 1968, p. 321. Importantly, page 323 of this reference attests to the inherent disadvantage of polysiloxane-polyether block copolymers in which polyether and polysiloxane units are linked via Si—O—C bonds: those linkage sites can be cleaved in the presence of compounds containing active hydrogen atoms, such as alcohols, polyols and water. Furthermore, this cleavage is accelerated considerably by the presence of acidic or basic compounds. Thus, in aqueous systems, this leads to the hydrolysis and, in alcoholic systems, to the alcoholysis of the polysiloxane-polyether block copolymers. And these effects obviously hinder the stable storage of formulations comprising such polysiloxane-polyether block copolymers where compounds containing active hydrogen atoms may be present.

Polysiloxane-polyether copolymers linked by hydrolytically stable, Si—C bonds are conventionally obtained by the hydrosilylation, under catalysis, of alkenyl-containing polyethers with SiH-terminated polysiloxanes. U.S. Pat. No. 5,625,023 (Chung et al.), US2010/0324251 (O'Lenick et al.) and EP 0643329 A2 (Ciba Geigy AG) are illustrative of hydrosilylation reactions of this type, which reactions are, however, not free from drawbacks. Heavy metals, such as platinum (Pt) and rhodium (Rh) employed as catalysts in the hydrosilylation reaction, can remain as contaminants of the copolymer products, contributing to a reduced shelf life and (yellowish-brown) coloration thereof. Moreover, most such homogeneous hydrosilylation catalysts promote the undesired O-sillylation reaction when unprotected alcohols are used as substrates: this generates hydrolytically unstable Si—O—C bonds, as a corollary to which low molecular weight side-products are produced and the obtained copolymer products are characterized by higher polydispersity. Still further, the common hydrosilylation methods are kinetically limited by the molecular weight—and viscosity—of the starting materials: that is, the larger the polymeric blocks to be connected, the lower the yield of the hydrosilylation reaction. This results in co-polymeric products with bimodal molecular weight distributions and high unsaturation content.

Further processes for the synthesis of polyether-polysiloxane block copolymers are taught in the art. U.S. Pat. No. 5,175,327 (Parkinson et al.) describes silanol ether compounds which are prepared by the ethoxylation and/or propoxylation of the hydroxyl group in a starter, silanol compound: the alkoxylation reaction is performed in the presence of a catalyst selected from the group consisting of potassium hydroxide, sodium methoxide, sodium hydroxide and phosphoric acid. It is submitted that the copolymers obtained when using the disclosed catalysts are of low molecular weight and highly unsaturated.

U.S. Pat. No. 5,290,912 (Takashi et al.) describes a process for the production of a polyoxyalkylene compound by the ring-opening polymerization of an alkylene oxide in the presence of a multi-metal cyanide complex catalyst and a hydrophobic initiator. In one embodiment, the initiator is an organopolysiloxane compound having an active hydrogen-containing functional group with which an alkylene oxide is reactive. As regards this embodiment, it is noted that the propoxylation of primary-alcohol terminated starters using double metal cyanide (DMC) catalysts is difficult on account of their high acidity and strong coordination with the metal centers: as such, the propoxylation must be conducted either in the presence of solvents and additives (such as antioxidants) or under harsh conditions.

U.S. Pat. No. 7,834,082 (Haider et al.) describes a method for producing a polyether-polydialkylsiloxane block copolymer constituted by: providing a mixture comprising at least one alkylene oxide and at least one silanol-terminated polydialkylsiloxane; and, polymerizing the mixture in the presence of a double metal cyanide (DMC) complex catalyst and optionally in the presence of an aprotic solvent and/or an antioxidant. The disclosed method is purported to yield polyether-polydialkylsiloxane block copolymers which have a molecular weight of from 150 to 50,000 g/mole and a polydispersity index (PDI) of 1.0 to 1.5. However, polymeric blocks of the derived copolymers are connected by the undesired Si—O—C moieties.

It is contended that a need exists in the art for a process for synthesizing high molecular weight A-(B—OH)$_n$ polyether (B)-polydiorganosiloxane (A) copolymers which are devoid of hydrolytically unstable Si—O—C linkages and which are characterized by a low unsaturation value, low polydispersity and a low heavy metal content, particularly a low platinum content.

BRIEF SUMMARY

In accordance with a first aspect of the invention there is provided a hydroxyl-functionalized polyether-polysiloxane block copolymer of the structure A(-X—B)$_n$ wherein: A represents said polysiloxane block;

B represents said polyether block;

X is a linker group characterized by including the moiety Si—C—C— of which said Si is the terminal silicon atom of the polysiloxane block A; and, n is an integer of from 2 to 4, said block copolymer being further characterized by a terminal unsaturation of less than 0.04 meq/g, preferably less than 0.03 meq/g and more preferably less than 0.025 meq/g measured in accordance with ASTM D4671-05.

In accordance with a preferred embodiment, the hydroxyl-functionalized polyether-polysiloxane block copolymer as defined above is obtained by the method comprising the steps of a) providing a compound having the general Formula (I)

Formula (I)

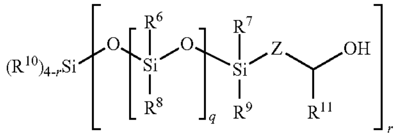

wherein: q is an integer of from 0 to 750, preferably from 5 to 250, more preferably from 5 to 150;

r is an integer from 2 to 4;

Z is either a polyoxyalkylene group having a molecular weight of less than 10000 g/mol or a $C_1$-$C_{60}$ alkylene group; and, $R^6$, $R^7$, $R^8$, $R^9$, $R^{10}$ and $R^{11}$ may be the same or different and each is independently selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group; and, b) in the presence of said compound of Formula (I) and a double metal cyanide complex catalyst, performing a ring opening polymerization of at least one alkylene oxide monomer having the general Formula (II):

Formula (II)

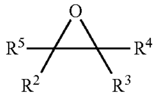

wherein: $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

In accordance with a second aspect of the invention there is provided a method for producing a hydroxyl-functionalized polyether-polysiloxane block copolymer as defined above and in the appended claims, said method comprising the steps of:

a) providing a compound having the general Formula (I)

Formula (I)

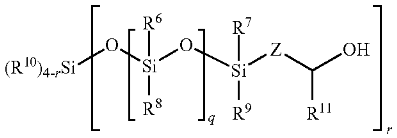

wherein: q is an integer of from 0 to 750, preferably from 5 to 250, more preferably from 5 to 150;

r is an integer from 2 to 4;

Z is either a polyoxyalkylene group having a molecular weight of less than 10000 g/mol or a $C_1$-$C_{60}$ alkylene group; and, $R^6$, $R^7$, $R^8$, $R^9$, $R^{10}$ and $R^{11}$ may be the same or different and each is independently selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group; and, b) in the presence of said compound of Formula (I) and a double metal cyanide complex catalyst, performing a ring opening polymerization of at least one alkylene oxide monomer having the general Formula (II):

Formula (II)

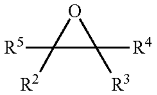

wherein: $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

In accordance with a preferred embodiment, step b) of the recited process comprises the ring opening polymerization of at least one alkylene oxide polymer conforming to Formula (II) but wherein: $R^2$, $R^3$ and $R^5$ are hydrogen; and $R^4$ is either a phenyl group or a $C_1$-$C_8$ alkyl group and, more preferably, a $C_1$-$C_4$ alkyl group.

In an important embodiment, the compound of Formula (I), provided as an initiator to the ring-opening polymerization of process step b) may be represented by general Formula (IA):

Formula (IA)

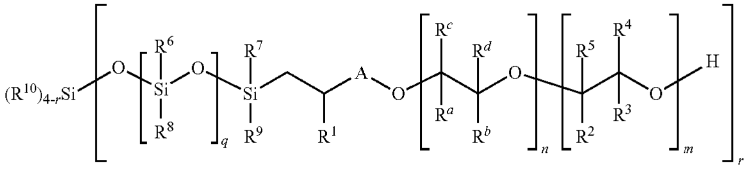

wherein: q is an integer of from 0 to 750, preferably from 5 to 250, more preferably from 5 to 150;

r is an integer from 2 to 4;

n is 0, 1, 2, 3, 4 or 5, preferably 0;

m is 1, 2, 3, 4 or 5, preferably 1;

$R^1$ is selected from hydrogen, a $C_1$-$C_8$alkyl group, a $C_3$-$C_{10}$ cycloalkyl group, a $C_6$-$C_{18}$ aryl group or a $C_6$-$C_{18}$ aralkyl group;

A denotes a spacer group which is constituted by a covalent bond or a $C_1$-$C_{20}$ alkylene group;

$R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen; and, $R^6$, $R^7$, $R^8$, $R^9$ and $R^{10}$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group.

Effective initiators of Formula (IA) may further be characterized by the conditions: n is 0; A is either a covalent bond or a $C_1$-$C_{12}$ alkylene group; and, $R^1$ is selected from hydrogen and a $C_1$-$C_6$ alkyl group and, more preferably, from hydrogen and a $C_1$-$C_4$ alkyl group. Alternatively or additionally, initiators of Formula (IA) may desirably be characterized by the conditions: $R^2$, $R^3$ and $R^5$ are hydrogen; and, $R^4$ is either a phenyl group or a $C_1$-$C_8$ alkyl group and, more preferably, a $C_1$-$C_4$ alkyl group.

It is noted that compounds having general Formula (IA), wherein r is 2 and one $R^{10}$ is $R^6$ and the other $R^{10}$ is $R^8$, may be prepared by a process comprising the steps of:

i) reacting a hydroxyalkyl allyl ether having a secondary or tertiary alcohol group with a disiloxane under anhydrous conditions and under catalysis of a transition metal catalyst of which the transition metal is selected from Groups 8 to 10 of the Periodic Table, said hydroxylalkyl allyl ether conforming to Formula (IV)

Formula (IV)

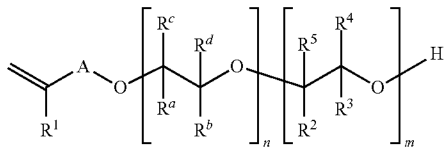

said disiloxane conforming to Formula (X)

Formula (X)

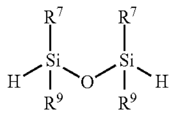

wherein n, m, A, $R^1$ to $R^5$, $R^7$ and $R^9$ and $R^a$ to $R^d$ have the meanings assigned in Formula (IA) above;

and, ii) in the presence of the reaction product of step i), performing a ring opening polymerization of at least one cyclic siloxane monomer having the general Formula (XI).

Formula (XI)

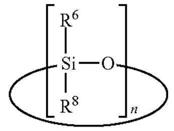

wherein $R^6$ and $R^8$ have the meanings assigned in Formula (IA) above n is 3, 4, 5, 6, 7 or 8, preferably 4.

In an alternative embodiment, compounds having general Formula (IA) may be prepared by reacting a compound represented by Formula (IV)

Formula (IV)

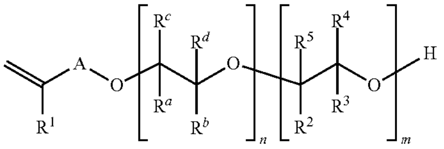

with a compound represented by Formula (VI):

Formula (VI)

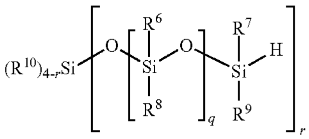

wherein said reaction is performed under at least one of the following conditions:

a molar ratio of allyl groups of said compound of Formula (IV) to Si—H groups of said polysiloxane of Formula (VI) of from 0.8:1 to 1.2:1, in particular 1:1;

a temperature from 25 to 250° C., preferably from 70 to 200° C.;

under anhydrous conditions; and, in the presence of a transition metal catalyst of which the transition metal is selected from Groups 8 to 10 of the Periodic Table.

In accordance with a third aspect of the present invention, there is provided the use of the hydroxyl-functionalized polyether-polysiloxane block copolymer as defined herein above or as obtained by the recited process as a reactive component for a coating composition, a sealant composition, an adhesive composition or a composition for additive manufacturing, said compositions being based on compounds bearing hydroxyl-reactive functionalities.

A still further aspect of the present invention concerns a silylated polymer obtainable by reacting the hydroxyl-functionalized polyether-polysiloxane block copolymer as defined herein above and in the appended claims with at least one isocyanatosilane of Formula (VII):

$$OCN—B—Si—(X)_m(R^{12})_{3-m} \qquad (VII)$$

wherein: m is 0, 1 or 2, preferably 0 or 1;

each $R^{12}$ is independently selected from a hydroxyl group, a $C_1$-$C_{10}$ alkoxy group, a $C_1$-$C_{10}$ acyloxy group, or —$OCH(R^{13})COOR^{14}$, wherein $R^{13}$ is selected from hydrogen or a $C_1$-$C_4$ alkyl group and $R^{14}$ is selected from a $C_1$-$C_8$ alkyl group;

each X is independently selected from a $C_1$-$C_8$ alkyl group which can optionally be interrupted by at least one heteroatom; and, B is selected from a $C_1$-$C_{20}$ alkylene group.

A related aspect of the invention teaches a silylated polymer obtainable by:

a) reacting the hydroxyl-functionalized polyether-polysiloxane block copolymer as defined herein above and in the appended claims with at least one polyisocyanate, employing a stoichiometric excess of the NCO groups of the polyisocyanate with respect to the OH groups of the hydroxyl-functionalized polyether-polysiloxane block copolymer to form a NCO-terminated prepolymer; and, b) reacting the NCO-terminated prepolymer with at least one silane having at least one NCO group-reactive functionality, preferably the silane having at least one NCO group-reactive functionality conforms to Formula (VIII):

$$R^{15}R^{16}N—R^{17}—SiXYZ \quad (VIII)$$

wherein: $R^{15}$ and $R^{16}$ are independently selected from hydrogen or a $C_1$-$C_8$ alkyl group;

$R^{17}$ is a divalent hydrocarbon residue having 1 to 12 carbon atoms, optionally comprising at least one heteroatom, preferably N or O; and X, Y, Z are independently selected from a hydroxyl group, a $C_1$-$C_8$ alkyl group, a $C_1$-$C_8$ alkoxy group or a $C_1$-$C_8$ acyloxy group, at least one of the substituents X, Y, Z being selected from a $C_1$-$C_8$ alkoxy or a $C_1$-$C_8$ acyloxy group.

In accordance with a final aspect of the invention there is provided an adhesive, sealant or coating composition comprising the defined silylated polymers.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

The molecular weights given in the present text refer to number average molecular weights (Mn), unless otherwise stipulated. All molecular weight data refer to values obtained by gel permeation chromatography (GPC) calibrated against polystyrene standards in accordance with DIN 55672-1:2007-08 at 40° C., unless otherwise stipulated.

As used herein, "polydispersity index" refers to a measure of the distribution of molecular mass in a given polymer sample. The polydispersity index is calculated by dividing the weight average molecular weight (Mw) by the number average molecular weight (Mn).

The hydroxyl (OH) values given herein are measured according to DIN 53240-2.

The isocyanate content values given herein are measured according to EN ISO 11909.

Viscosities of polymers and of compositions containing said polymers as described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the polymers are done using the No. 6 spindle at a speed of 20 revolutions per minute for 1 minute until the viscometer equilibrates. The viscosity corresponding to the equilibrium reading is then calculated using the calibration.

The terminal unsaturation of the block copolymer is measured in accordance with ASTM D4671-05.

For convenience in the description of the process of this invention, unsaturation provided by $CH_2$=CH—$CH_2$— terminal group is referred to as "allyl" unsaturation.

As used herein, "$C_1$-$C_8$ alkyl" group refers to a monovalent group that contains 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)—should be noted.

The terms "$C_1$-$C_{60}$ alkylene group" and "$C_1$-$C_{20}$ alkylene group" refer respectively to divalent groups that contain from 1 to 60 or from 1 to 20 carbon atoms, that are radicals of an alkane and include linear, branched organic or cyclic groups, which groups may be substituted or substituted and may optionally be interrupted by at least one heteroatom. Where the term "$C_1$-$C_{20}$ alkylene group" is used to define the components A and B herein, it is particularly preferred for said alkylene group to be uninterrupted or to be interrupted by one heteroatom, especially oxygen.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

Where mentioned, the expression "interrupted by at least one heteroatom" means that the main chain of a residue comprises, as a chain member, at least one atom that differs from carbon atom. More particularly the term "heteroatom" refers to nitrogen, oxygen, halogens, phosphorus or sulfur. Oxygen (O) and nitrogen (N) may be mentioned as typical heteroatoms in the context of the present invention.

In accordance with established terminology, a primary alcohol is understood to be an alcohol, the hydroxy (—OH) group of which is present as a —$CH_2$—OH group. A "secondary alcohol group" or a "secondary hydroxyl group" is constituted by a hydroxy group (—OH) attached to a saturated carbon atom which has two other carbon atoms attached to it. Analogously, a "tertiary alcohol group" or "tertiary hydroxyl group" is constituted by a hydroxy group (—OH) attached to a saturated carbon atom which has three other carbon atoms attached to it.

The term "polyisocyanate" means a compound which has at least two isocyanate groups —NCO. This compound does not have to be a polymer, and instead is frequently a low molecular compound.

The term "polymerization conditions" means the reaction conditions necessary to combine monomers into polymers, and in the context of this invention, those conditions necessary for ring-opened alkylene oxides to combine with one another to form a polyether polymer.

As used herein, the term "ring-opening polymerization" denotes a polymerization in which a cyclic compound (monomer) is opened to form a linear polymer. Reference in this context may be made to inter alia in: i) Duda, A. et al. *Thermodynamics and Kinetics of Ring-Opening Polymerization in Handbook of Ring-Opening Polymerization*, Wiley-VCH, Weinheim, Germany, (2009) page 8; ii) Choijnowski, J. et al. *Kinetically controlled ring-opening polymerization*, J. Inorg. Organomet. Polym. (1991) 1, pages 299-323; and, iii) Nuyken et al. *Ring-Opening Polymerization—An Introductory Review Polymers* 2013, 5, 361-403.

As used herein, the term "catalytic amount" means a sub-stoichiometric amount of catalyst relative to a reactant.

The term "double metal cyanide (DMC) compound" is used in accordance with its standard meaning as an inorganic compound compromising cyanide anions and two different metal cations. For completeness, the two metal cations differ from each other based either on the metal per se or on their oxidation numbers.

As used herein, a double metal cyanide catalyst complex—often denoted as [DMCC] hereinafter—comprises a double metal cyanide (DMC) compound, at least one organic complexing agent and a metal salt. That complex may be unsupported or supported on an appropriate support material.

As used herein, the term "halogen" refers to fluorine, chlorine, bromine or iodine and correspondingly the term "halide" denotes fluoride, chloride, bromide or iodide anions.

In those embodiments where the double metal cyanide catalyst complexes comprise an alcohol (A), that alcohol term is intended to encompass both the protonated and de-protonated (alcoholate) forms thereof.

As regards said double metal cyanide catalyst complexes, the term "carboxylate" refers to —$COO^-$ moiety. Suitable carboxylate anions may be aliphatic or aromatic and may typically contain from 1 to 24, preferably from 2 to 18 and more preferably from 2 to 12 carbon atoms. Examples of aliphatic carboxylate anions include but are not limited to: formate; acetate; propionate; butyrate; 2-ethylhexanoate; n-octoate; and, decanoate. Examples of aromatic carboxylates include but are not limited to: benzoate; alkyl-substituted benzoate; halo-substituted benzoate; 4-cyanobenzoate; 4-trifluoromethylbenzoate; salicylate; 3,5-di-t-butylsalicylate; and, subsalicylate.

As further used herein with regard to said double metal cyanide catalyst complexes, "an organic complexing agent"—denoted as (L, $L^1$ and $L^2$) in Formulae (III) and (III-A)—is understood to be an organic compound that has a functional group acting as an electron donor and is therefore capable of occupying a coordination site on a metallic central atom or central ion. Herein, compounds that are suitable as organic complexing agents preferably also exhibit a certain solubility in water.

Suitable organic complexing agents of the present invention—denoted where applicable as L, $L^1$ and $L^2$-may be monomeric, oligomeric or polymeric compounds and may broadly include: alcohols and in particular aliphatic $C_1$ to $C_{24}$ alcohols and polyalkylene glycol homo- and co-polymers; aldehydes; ketones; ethers, such as monoglyme, diglyme, 1,4-dioxane and furan; esters; amides; urea derivatives; nitriles; sulfides; and, mixtures of two or more of the above-mentioned compounds.

In an illustrative embodiment, each organic complexing agent (L, $L^1$, $L^2$) of Formula (III) and (III-A) may be independently selected from the group consisting of: aliphatic $C_1$ to $C_{24}$ alcohols such as ethanol, i-propyl alcohol, n-butyl alcohol, i-butyl alcohol, sec-butyl alcohol, tert-butyl alcohol; monoglyme; diglyme; 1,4-dioxane; furan; polyalkylene glycol homo- and co-polymers; polycarbonates; polyalkylene glycol sorbitan esters; polyalkylene glycol glycidyl ethers; polyacrylamide; poly(acrylamide-co-acrylic acid); polyacrylic acid; poly(acrylamide-co-maleic acid); polyacrylonitrile; polyalkyl acrylate; polyalkyl methacrylate; polyvinyl methyl ether; polyvinyl ethyl ether; polyvinyl acetate; polyvinyl alcohol; poly-N-vinylpyrrolidone; poly (N-vinylpyrrolidone-co-acrylic acid); polyvinyl methyl ketone; poly(4-vinylphenol); poly(acrylic acid-co-styrene); oxazoline polymers; polyalkylenimines; maleic acid and maleic anhydride copolymers; hydroxyethylcellulose; polyacetates; ionic surface- and interface-active compounds; carboxylic esters of polyhydric alcohols; and, glycosides.

The term "polyalkylene glycol" designates polyalkyleneglycol radicals of which the alkylene radical desirably contains from 2 to 7 carbon atoms. Thus, in some embodiments, polyalkylene glycol polymers can include polymers of the following general formula H—O—$(RO)_x$—H in which: R is a linear or branched $C_2$ to $C_7$ alkyl; and, x is a positive integer in the range of from 2 to 1000. Importantly, polyalkylene glycol polymers can be in the form of a homopolymer, or mixtures or combinations of homopolymers, or can include copolymers, such as block or random copolymers, or mixtures of combinations of such copolymers, or can include mixtures or combinations of homopolymers and copolymers.

The term "ionic surface- or interface-active compounds" employed in relation to said double metal cyanide catalyst complexes is established in the art, as may be attested to by referring to inter alia: *Ullmann's Encyclopedia of Industrial Chemistry*, $5^{th}$ Edition (1994) Vol. A25, pp. 747-817; *Kirk-Othmer Encyclopedia of Chemical Technology*, $4^{th}$ Edition (1997) Vol. 23, pp. 477-541, John Wiley & Sons, New York; Tensid-Taschenbuch, $2^{nd}$ Edition (1982), H. Stache (ed.), Carl Hanser Verlag, Munich; and, *Surfactant Science Series*, Vol. 1-74 (1967-1998) M. J. Schick (Ed.), Marcel Decker, New York. Examples of such ionic surface- or interface-active compounds may be found in the group of surfactants, soaps, emulsifiers, detergents and dispersants.

The double metal cyanide catalyst complexes according to the present invention may be crystalline, partially crystalline or amorphous: crystallinity is conventionally analysed by powder X-ray diffractometry. Further, the composition of the double metal cyanide catalyst complexes may conventionally be analysed by means of: gas chromatography; elemental analysis; thermogravimetry; or, extractive removal of the moieties (L, $L^1$, $L^2$) thereof with subsequent gravimetric determination.

The term "anhydrous" is intended to mean herein that the applicable reaction mixture or component comprises less than 0.25 wt. % of water, based on the weight of the mixture or component. The term "essentially free of solvent" should be interpreted analogously as meaning the relevant composition comprises less than 0.25 wt. % of solvent.

As used herein, "additive manufacturing" is used in accordance with its standard definition (ASTM F2792) and thereby encompasses processes involving the buildup of one or more materials—typically as successive layers—to form a three-dimensional structure: it is to be contrasted with subtractive manufacturing methods. Additive manufacturing processes include fabrication and prototyping techniques such as, but not limited to, freeform fabrication, 3D printing and rapid prototyping or tooling. In turn, exemplary 3D printing techniques include, but are not limited thereto, scanning laser epitaxy and direct metal laser sintering (DMLS).

DETAILED DESCRIPTION

The present invention provides for a hydroxyl-functionalized polyether-polysiloxane block copolymer of the structure A(-X—B)$_n$ wherein: A represents said polysiloxane block;

B represents said polyether block;

X is a linker group characterized by including the moiety Si—C—C— of which said Si is the terminal silicon atom of the polysiloxane block A; and, n is an integer of from 2 to 4, said block copolymer being further characterized by a terminal unsaturation of less than 0.04 meq/g, preferably less than 0.03 meq/g and more preferably less than 0.025 meq/g measured in accordance with ASTM D4671-05.

The hydroxyl-functionalized polyether-polysiloxane block copolymer is preferably further characterized by one or both of: i) a number average molecular weight (Mn) of from 1000 to 60000 g/mol, preferably from 2000 to 30000 g/mol; and, ii) a polydispersity index (PDI) in the range from 1.0 to 1.5, preferably from 1.0 to 1.15.

The present invention also provides for the synthesis of a hydroxyl-functionalized polyether-polysiloxane block copolymer by a process comprising:

a) providing a compound in accordance with Formula (I) as defined herein above; and, b) reacting an alkylene oxide monomer under polymerization conditions in the presence, as an initiator, of said compound of Formula (I) and in the presence of a double metal cyanide (DMC) complex catalyst.

Compounds of Formula (I) may be known commercially, for which examples include Silsurf™ Di-1010, Silsurf™ Di-2012 and Silsurf™ Di-15-I. Further, compounds of Formula (I) may be prepared by a number of synthesis methods known to the person of ordinary skill in the art including synthesis via hydrosilylation. Mention in this regard may be made of: J. L. Speier et al., J. Am. Chem. Soc. 1957, 79, p. 974, A. J. Chalk et al., J. Am. Chem. Soc. 1965, 87, p. 16, and B. Marciniec, Hydrosilylation, Vol. 1, Springer Netherlands, 2009.

In an important embodiment of the present invention, the initiator provided in step a) of the process conforms to Formula (IA):

Formula (IA)

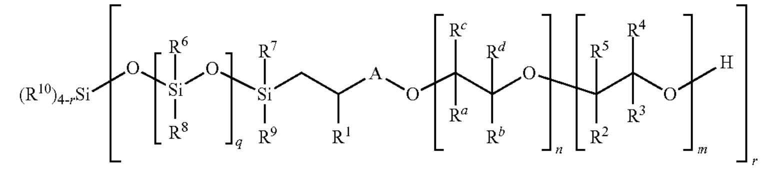

wherein: n, m, A, q, r, $R^1$ to $R^{10}$ and $R^a$ to $R^d$ have the meanings assigned below.

Thereby, two important embodiment of process step a) entail the provision, by synthesis, of a compound of Formula (IA).

Process Step a): First Exemplary Synthesis of Compounds of Formula (IA)

This exemplary synthesis comprises the reaction of:

i) a hydroxyalkyl-allyl ether having a secondary or tertiary alcohol group, in accordance with Formula (IV); and, ii) a polysiloxane of Formula (VI) which possesses at least 2 silicon bonded hydrogen terminal groups.

Hydroxyalkyl-Allyl Ethers

The hydroxyalkyl-allyl ethers of this important embodiment of the present invention, which possess allyl unsaturation and a secondary or tertiary hydroxyl group, conform to the following general Formula (IV):

Formula (IV)

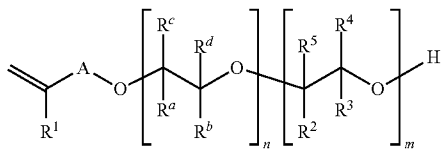

wherein n is 0, 1, 2, 3, 4 or 5, preferably 0; m is 1, 2, 3, 4 or 5, preferably 1; A denotes a spacer group which is constituted by a covalent bond or a $C_1$-$C_{20}$ alkylene group; $R^1$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

Compounds conforming to Formula (IV) are most suitably derived as alkylene oxide adducts of primary or secondary alcohols having allyl unsaturation.

Said alcohols having allyl unsaturation will conform to Formula (V) herein below:

Formula (V)

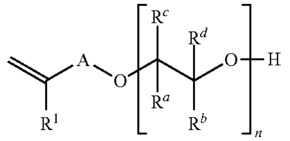

wherein n, A, $R^1$, $R^a$, $R^b$, $R^c$ and $R^d$ have the meanings assigned above. In a preferred embodiment: n is 0; A is either a covalent bond or a $C_1$-$C_{12}$ alkylene group; and, $R^1$ is selected from hydrogen and a $C_1$-$C_6$ alkyl group and, more preferably, from hydrogen and a $C_1$-$C_4$ alkyl group.

Suitable alcohols having allyl unsaturation for use in the present invention include: allyl alcohol; methallyl alcohol; 3-buten-1-ol; isoprenol (3-methyl-3-buten-1-ol); 2-methyl-3-buten-1-ol; 2-methyl-3-buten-2-ol; 1-penten-3-ol; 3-methyl-1-penten-3-ol; and, 4-methyl-1-penten-3-ol. Particular preference is given to using allyl alcohol or methallyl alcohol.

The alkylene oxide conforms to Formula (II) herein below:

Formula (II)

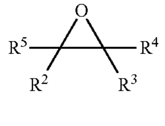

wherein $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen. It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Suitable alkylene oxide reactants include one or more of: propylene oxide; 1,2-butylene oxide; cis-2,3-epoxybutane; trans-2,3-epoxybutane; 1,2-epoxypentane; 1,2-epoxyhexane; decene oxide; and, styrene oxide. Particular preference is given to using propylene oxide.

Any known method for forming such adducts may be employed. However, commonly, in the presence of a basic catalyst, a controlled amount of alkylene oxide is slowly mixed with the preheated alcohol over a reaction time of up to 20 hours and in an amount sufficient to form the desired oxyalkylated reaction product. The unsaturated alcohol should be free of water and may therefore be vacuum stripped in advance of being preheated to a temperature, typically, of from 75 to 150° C.

During the introduction of the oxide, the concentration of unreacted alkylene oxide in the liquid reaction mixture and the current degree of addition of the alkylene oxide onto the unsaturated starter can be monitored by known methods. These methods include, but are not limited to: optical methods, such as Infrared and Raman spectroscopy; viscosity and mass flow measurements, after appropriate calibration; measurement of the dielectric constant; and, gas chromatography.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

Suitable basic catalysts, which may be used individually or in admixture, include: alkali metal hydroxides such as KOH, NaOH and CsOH; alkaline earth metal hydroxides, such as $Ca(OH)_2$ and $Sr(OH)_2$; and, alkali metal alkoxides, such as KOMe, NaOMe, KOt-Bu and NaOt-Bu. The catalysts should typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

For completeness, illustrative citations describing the alkoxylation of allyl alcohol include: U.S. Pat. Nos. 9,073,836; 3,268,561; 4,618,703; and, J. Am. Chem. Soc. 71 (1949) 1152.

Polysiloxanes

The polysiloxane reactants of the exemplary synthesis are represented by the Formula (VI) herein below:

Formula (VI)

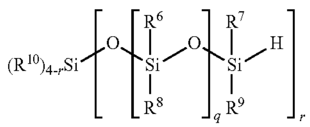

wherein: q is an integer of from 0 to 750, preferably from 5 to 250, more preferably from 5 to 150;

r is an integer from 2 to 4;

$R^6$, $R^7$, $R^8$, $R^9$ and $R^{10}$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group.

In an embodiment, each of $R^6$, $R^7$, $R^8$, $R^9$ and $R^{10}$ represents a $C_1$-$C_6$ alkyl group, a $C_3$-$C_6$ cycloalkyl group or a $C_6$-$C_{18}$ aralkyl group. Preferably, each of $R^6$, $R^7$, $R^8$, $R^9$ and R10 represents a $C_1$-$C_4$ alkyl group, a $C_5$-$C_6$ cycloalkyl group or phenyl group. For example, at least two of $R^6$, $R^7$, $R^8$, $R^9$ and $R^{10}$ may be a $C_1$-$C_4$ or a $C_1$-$C_2$ alkyl group. Most particularly, it is preferred that each of $R^6$, $R^7$, $R^8$, $R^9$ and $R^{10}$ of Formula (VI) are independently selected from methyl and phenyl groups.

The polysiloxanes of the general Formula (VI) may be commercial products or can be prepared by processes known in organosilicon chemistry. For illustrative purposes only, mention may be made of the disclosure of U.S. Pat. No. 2,491,843 (Wilcock).

Process Conditions

The hydroxyalkyl-allyl ether of Formula (IV) and the polysiloxane of Formula (VI) are generally reacted at a molar ratio of allyl groups of said adduct to Si—H groups of said polysiloxane of from 0.8:1 to 1.2:1, in particular 1:1. The reaction may be carried out under atmospheric or elevated pressure. Further, the reaction is carried out at a temperature from 25 to 250° C. and preferably from 70 to 200° C. And in carrying out the reaction, organic solvents may or may not be used but, when employed, solvents such as toluene, xylene, heptane, dodecane, ditolylbutane, cumene and mixtures thereof are preferred.

Importantly, the reaction is performed under anhydrous conditions and in the presence of a catalyst, wherein the catalyst used is a transition metal catalyst of which the transition metal is selected from Groups 8 to 10 of the Periodic Table and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in step i) of the present method, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.5 to 72 hours to reach completion, more commonly from 1 to 30 or 1 to 20 hours.

Upon completion of the reaction, it is facile to remove any solid, suspended compounds by, for example, filtration, cross-flow filtration or centrifugation. Further, the reaction product—of Formula (IA)—may be worked up, using methods known in the art, to isolate and purify the product. For example, any solvent present may be removed by stripping at reduced pressure.

Process Step a): Second Exemplary Synthesis of Compounds of Formula (IA)

In accordance with this second exemplary synthesis, said compound having general Formula (IA), wherein r is 2 and one $R^{10}$ is $R^6$ and the other $R^{10}$ is $R^8$, is prepared by a process comprising the steps of:

a) i) reacting a hydroxyalkyl allyl ether having a secondary or tertiary alcohol group with a disiloxane under anhydrous conditions and under catalysis of a transition metal catalyst of which the transition metal is selected from Groups 8 to 10 of the Periodic Table, said hydroxylalkyl allyl ether conforming to Formula (IV)

Formula (IV)

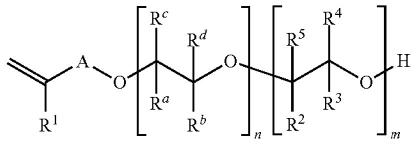

said disiloxane conforming to Formula (X)

Formula (X)

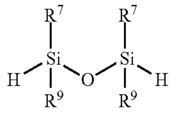

wherein n, m, A, $R^1$ to $R^5$, $R^7$ and $R^9$ and $R^a$ to $R^d$ have the meanings assigned in Formula (IA) above;

and, a) ii) in the presence of the reaction product of step i), performing a ring opening polymerization of at least one cyclic siloxane monomer having the general Formula (XI).

Formula (XI)

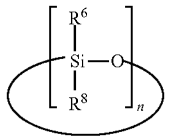

wherein $R^6$ and $R^8$ have the meanings assigned in Formula (IA) above, and n is 3, 4, 5, 6, 7 or 8, preferably 4.

Hydroxyalkyl-Allyl Ethers

The hydroxylalkyl allyl ether of Formula (IV) may be prepared in the manner discussed herein before.

Disiloxanes

The disiloxane reactants of the first synthetic step a) i) of this exemplary embodiment are represented by the Formula (X) herein below:

Formula (X)

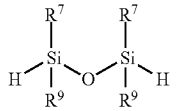

wherein: $R^7$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group.

In an embodiment, each of $R^7$ and $R^9$ represents a $C_1$-$C_6$ alkyl group, a $C_3$-$C_6$ cycloalkyl group or a $C_6$-$C_{18}$ aralkyl group. Preferably, each of $R^7$ and $R^9$ represents a $C_1$-$C_4$ alkyl group, a $C_5$-$C_6$ cycloalkyl group or phenyl group. For example, $R^7$ and $R^9$ may each be a $C_1$-$C_4$ or a $C_1$-$C_2$ alkyl group. Most particularly, it is preferred that each of $R^7$ and $R^9$ of Formula (X) are independently selected from methyl and phenyl groups.

For completeness, an illustrative list of disiloxanes of Formula (X) include: 1,1,3,3-tetramethyldisiloxane; 1,1,3,3-tetraethyldisiloxane; 1,1,3,3-tetra-n-propyldisiloxane; 1,1,3,3-tetraisopropyldisiloxane; 1,1,3,3-tetra-n-butyldisiloxane; 1,1,3,3-tetraisobutyldisiloxane; 1,1,3,3-tetra-sec-butyldisiloxane; 1,1,3,3-tetra-tert-butyldisiloxane; 1,1,3,3-tetracyclopentyldisiloxane; 1,1,3,3-tetracyclohexyldisiloxane; 1,3-diethyl-1,3-dimethyldisiloxane; 1,3-dimethyl-1,3-di-n-propyldisiloxane; 1,3-dimethyl-1,3-diisopropyldisiloxane; 1,3-di-n-butyl-1,3-dimethyldisiloxane; 1,3-diisobutyl-1,3-dimethyldisiloxane; 1,3-di-sec-butyl-1,3-dimethyldisiloxane; 1,3-di-tert-butyl-1,3-dimethyldisiloxane; 1,3-dicyclopentyl-1,3-dimethyldisiloxane; 1,3-dicyclohexyl-1,3-dimethyldisiloxane; 1,3-diethyl-1,3-di-n-propyldisiloxane; 1,3-diethyl-1,3-diisopropyldisiloxane; 1,3-di-n-butyl-1,3-diethyldisiloxane; 1,3-diisobutyl-1,3-diethyldisiloxane; 1,3-di-sec-butyl-1,3-diethyldisiloxane; 1,3-di-tert-butyl-1,3-diethyldisiloxane; 1,3-dicyclopentyl-1,3-diethyldisiloxane; and, 1,3-dicyclohexyl-1,3-diethyldisiloxane.

The disiloxanes of the general Formula (X) may be commercial products or can be prepared by processes known in organosilicon chemistry. For example, the dihydrotetra(organyl)siloxanes are obtainable by hydrolysis of halodi(organyl)-H-silanes. Said halodi(organyl)-H-silanes are themselves either commercially available products or are obtainable by, for example: the direct synthesis of silicon with haloorganyls following the Müller-Rochow process; and, salt elimination reactions of metal organyls—such as Grignard reagents or lithium organyls—with dihalo(organyl)silanes.

Process Conditions of Synthesis Step a) i)

The hydroxyalkyl-allyl ether of Formula (IV) and the disiloxane of Formula (X) are generally reacted such that the molar ratio of said ether (adduct) to said disiloxane is from 2.6:1 to 1.8:1. The reaction may be carried out under atmospheric or elevated pressure. Further, the reaction is carried out at a temperature of not lower than 15° C., preferably from 50 to 250° C. and more preferably from 70 to 200° C. And in carrying out the reaction, organic solvents may or may not be used but, when employed, solvents such as toluene, xylene, heptane, dodecane, ditolylbutane, cumene and mixtures thereof are preferred.

Importantly, the reaction is performed under anhydrous conditions and under catalysis, wherein the catalyst used is a transition metal catalyst of which the transition metal is selected from Groups 8 to 10 of the Periodic Table (https://iupac.org/what-we-do/periodic-table-of-elements/) and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in synthesis step a) i) of this embodiment, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.5 to 72 hours to reach completion, more commonly from 1 to 30 or 1 to 20 hours.

Upon completion of the reaction, it is facile to remove any solid, suspended compounds by, for example, filtration, crossflow filtration or centrifugation. Further, the reaction product may be worked up, using methods known in the art, to isolate and purify the product. For example, any solvent present may be removed by stripping at reduced pressure.

Process Conditions for Synthesis Step a) ii)

In a reaction vessel which is capable of imparting shear to the contents thereof and under polymerization conditions, the product of step a) i) is reacted with at least one cyclic siloxane having the general Formula (XI) as described herein below:

Formula (XI)

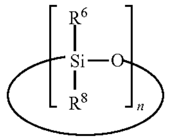

wherein: n is 3, 4, 5, 6, 7 or 8, preferably 4;

$R^6$ and $R^8$ may the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group.

For completeness, the use of mixtures of co-polymerizable cyclic siloxane monomers is envisaged in the present invention. Further, whilst suitable cyclic siloxane monomers will generally contain "n" identical $R^6$ groups and "n" identical $R^8$ groups, the $R^6$ and $R^8$ groups attached to a given silicon atom need not necessarily be the same as those attached to an adjacent silicon atom. For example, the monomers $[(C_2H_5)(C_6H_5)SiO]_2[(C_2H_5)_2SiO]$ and $[(C_2H_5)(C_6H_5)SiON(C_2H_5)_2)SiO]_2$ are considered monomers within the terms of Formula (XI).

In an embodiment, each $R^6$ and $R^8$ may independently represent a $C_1$-$C_8$ alkyl group. An exemplary, but not limiting list of cyclic siloxanes of meeting this embodiment of Formula (V) includes: $[(CH_3)_2SiO]_8$; $[(CH_3)_2SiO]_7$; $[(CH_3)_2SiO]_6$; decamethylcyclopentasiloxane (D5); octamethylcyclotetrasiloxane (D4); hexamethylcyclotrisiloxane (D3); $[(CH_3)(C_2H_5)SiO]_3$; $[(CH_3)(C_2H_5)SiO]_4$; $[CH_3)(C_2H_5)SiO]_5$; $[(CH_3)(C_2H_5)SiO]_6$; $[(C_2H_5)_2SiO]_3$; $[(C_2H_5)_2SiO]_4$; and, $[(C_2H_5)_2SiO]_5$. Within said embodiment, it is preferred that $R^9$ and $R^{10}$ are the same. More particularly, it is preferred that $R^6$ and $R^8$ of the cyclic siloxanes of Formula (XI) are both methyl ($C_1$). Good results have, for instance, been obtained when the cyclic siloxane of Formula (XI) is octamethylcyclotetrasiloxane (D4).

Whilst the above preferences should be duly noted, further cyclic siloxane monomers of Formula (XI) which might find utility in the present invention include: octaphenylcyclotetrasiloxane; tetramethylcyclotetrasiloxane; tetramethyltetravinylcyclotetrasiloxane; $[(C_6H_5)_2SiO]_3$; $[(C_2H_5)(C_6H_5)SiO]_3$; and, $[(C_2H_5)(C_6H_5)SiO]_4$.

Whilst there is no specific intention to limit the mechanism of ring opening polymerization employed in the step a) ii) of this embodiment and whilst therefore ring opening polymerization of cyclic siloxane monomers by the anionic route, via basic catalysts is not strictly precluded, it is preferred herein for said polymerization to proceed by a cationic route, via acid catalysis. Broadly, any suitable acidic ring opening polymerization catalyst may be utilized herein and, equally, mixtures of catalysts may be employed. Both Lewis and Brönsted acids may be suitable in this context, but the latter are preferred as they tend to be effective at temperatures of less than 150° C. and are usually effective at temperatures of from 50 to 100° C.

Examples of suitable Lewis acids include but are not limited to: $BF_3$; $AlCl_3$; t-BuCl/$Et_2AlCl$; $Cl_2/BCl_3$; $AlBr_3$; $AlBr_3.TiCl_4$; $I_2$; $SbCl_5$; $WCl_6$; $AlEt_2Cl$; $PF_5$; $VCl_4$; $AlEtCl_2$; $BF_3Et_2O$; $PCl_5$; $PCl_3$; $POCl_3$; $TiCl_6$; and, $SnCl_4$.

Examples of Brönsted acid or proton acid type catalysts—which may optionally be disposed on solid, inorganic supports—include, but are not limited to: HCl; HBr; HI; $H_2SO_4$; $HClO_4$; para-toluenesulfonic acid; trifluoroacetic acid; and, perfluoroalkane sulfonic acids, such as trifluoromethane sulfonic acid (or triflic acid, $CF_3SO_3H$), $C_2F_5SO_3H$, $C_4F_9SO_3H$, $C_5F_{11}SO_3H$, $C_6F_{13}SO_3H$ and $C_8F_{17}SO_3H$. The most preferred of these strong acids is trifluoromethane sulfonic acid (triflic acid, $CF_3SO_3H$).

The catalysts for said ring opening polymerization may usually be employed at a concentration of from 1 to 1000 ppm by weight based on the total weight of the cyclic siloxane monomers to be polymerized. Preferably from 5 to 150 ppm by weight are used, most preferably from 5 to 50 ppm. The catalytic amount may be reduced when the temperature at which the monomers and the catalyst are contacted is increased.

The ring opening polymerization may conveniently be carried out at a temperature in the range from 10 to 150° C. Preferably, however, the temperature range is from 20 or 50 to 100° C., as obviating high temperatures can limit the loss of volatile cyclic siloxanes from the reaction mixture due to their lower boiling point.

The process pressure is not critical. As such, the polymerization reaction can be run at sub-atmospheric, atmospheric, or super-atmospheric pressures but pressures at or above atmospheric pressure are preferred.

Importantly, the reaction should be performed under anhydrous conditions and in the absence of any compound having an active hydrogen atom. Exposure to atmospheric moisture may be avoided by providing the reaction vessel with an inert, dry gaseous blanket. Whilst dry nitrogen, helium and argon may be used as blanket gases, precaution should be used when common nitrogen gases are used as a blanket, because such nitrogen may not be dry enough on account of its susceptibility to moisture entrainment; the nitrogen may require an additional drying step before use herein.

The duration of the reaction is dependent on the time taken for the system to reach equilibrium. Equally, however, it is understood that the desired product can be obtained by stopping the equilibration at exactly the desired time: for example, the reaction can be monitored by analyzing viscosity over time or by analyzing monomer conversion using gas chromatography and the reaction stopped when the desired viscosity or monomer conversion is attained. These considerations aside, the polymerization reaction generally takes place for from 0.5 to 72 hours and more commonly from 1 to 30 or 1 to 20 hours. Acid catalysts present in the reaction mixture at the end of the polymerization reaction can easily be neutralized in order to stabilize the reaction product.

Upon completion of the polymerization, it is possible to remove any solid, suspended compounds by, for example, filtration, crossflow filtration or centrifugation. Further, the output of the polymerization may be worked up, using methods known in the art, to isolate and purify the hydroxyl-functionalized polysiloxanes. Mention in this regard may be made of extraction, evaporation, distillation and chromatography as suitable techniques.

Process Step b)

Most broadly, this second step of the present invention is constituted by the ring-opening polymerization of an alkylene oxide in the presence of a double metal cyanide catalyst complex and, as initiator, a compound of Formula (I). Having regard to the above exemplary syntheses, the ring-opening polymerization is thereby performed in the presence the hydroxyl-functional adduct of Formula (IA).

Double metal cyanide catalyst complexes and the methods by which such complexes may be prepared are known in the art. The attention of the reader may, for example, be directed to: US 2008/0167502 (BASF); US 2003/0158449 (Bayer); US 2003/0069389 (Shell); US 2004/0220430 (Repsol Quimica); US 2005/0065383 (Dow); WO2012/136657 A1 (Henkel AG & Co. KGgA); EP0894108 (Arco); U.S. Pat. No. 5,767,323 (Yiannakis et al.); and, U.S. Pat. No. 5,536,883 (Arco). With specific regard to double metal cyanide (DMC) catalyst complexes of Formula (I), the disclosure of WO2012/136658 A1 (Henkel AG & Co. KGgA) and particularly the passage from page 2, final paragraph to page 6, 1st paragraph thereof, is incorporated herein by reference.

There is no particular intention to limit the double metal cyanide catalyst complex which may find utility in the present invention. In a preliminary embodiment, said double metal cyanide complex [DMCC] is represented by the general Formula (III-A)

$$M^1_d[M^2(CN)_e]_f * xM^3(X)_g * yH_2O * \omega L \quad (III\text{-}A)$$

wherein: $M^1$ is a Zn, Fe, Co, Ni, Mn, Cu, Sn or Pb ion;

$M^2$ is a Fe, Co, Mn, Cr, Ir, Rh, Ru or V ion;

$M^3$ is a Zn, Fe, Co, Ni, Mn, Cu, Sn, Pb, Cr, Ir, Rh, Ru or V ion;

X is an anion;

L is an organic complexing agent;

d, e, f and g are each integers>0 but have values such that the complex $M^1_d[M^2(CN)_e]_f*xM^3(X)_g$ is electrically neutral;

$0.1 \leq x \leq 5$;

$0.1 \leq y \leq 1$; and, $0.0001 \leq \omega \leq 6$.

In a further embodiment, the aforementioned double metal cyanide complex [DMCC] is represented by the general Formula (III):

$$M^1_d[M^2(CN)_e]_f * xM^3(X)_g * yH_2O * zL^1 * aL^2 \quad (III)$$

wherein: $M^1$ is a Zn, Fe, Co, Ni, Mn, Cu, Sn or Pb ion;

$M^2$ is a Fe, Co, Mn, Cr, Ir, Rh, Ru or V ion;

$M^3$ is a Zn, Fe, Co, Ni, Mn, Cu, Sn, Pb, Cr, Ir, Rh, Ru or V ion;

X is an anion;

$L^1$ and $L^2$ are respectively first and second organic corn plexing agents;

d, e, f and g are each integers>0 but have values such that the complex $M^1_d[M^2(CN)_e]_f*xM^3(X)_g$ is electrically neutral;

$0.1 \leq x \leq 5$;

$0.1 \leq y \leq 1$;

$0.0001 \leq z \leq 1$; and, $0.0001 \leq a \leq 5$.

For completeness, said first ($L^1$) and second ($L^2$) organic complexing agents are distinct from one another.

In general formulae (III) and (III-A), x, y, w, z and a are to be understood as representing the average molar proportion of the particular constituent, based on a (single) complex $M^1_d[M^2(CN)_e]_f$. The integers d, e, f and g, on the other hand, have a stoichiometric meaning, which is limited to the complex $M^1_d[M^2(CN)_e]_f*M^3(X)_g$ and represents a complete charge balance within this complex.

X in general Formula (III) is preferably an anion selected from the group consisting of halide, hydroxide, sulphate, hydrogen sulphate, carbonate, hydrogen carbonate, cyanide, thiocyanide, isocyanate, cyanate, carboxylate, nitrate, nitrite, borate and antimonite.

Good results have been obtained for that embodiment wherein said double metal cyanide complex [DMCC] is represented by Formula (III-A) and further meets at least one of the following conditions:

i) $M^1$ is equal to $M^3$;

ii) X is an anion selected from the group consisting of halide, hydroxide, sulphate, carbonate, cyanide, thiocyanide, carboxylate, nitrate, borate and antimonite; and, iii) L is selected from the group consisting of aliphatic $C_1$ to $C_{24}$ alcohols, monoglyme, diglyme, 1,4-dioxane, furan, polypropylene glycol (PPG) homopolymers, polypropyleneglycol (PPG) copolymers and mixtures of two or more thereof.

Equally, good results have been obtained for that embodiment where said double metal cyanide complex [DMCC] of Formula (III) meets at least one of the following conditions:

i) $M^1$ is equal to $M^3$;

ii) X is an anion selected from the group consisting of halide, hydroxide, sulphate, carbonate, cyanide, thiocyanide, carboxylate, nitrate, borate and antimonite; and, iii) $L^1$ and $L^2$ are independently selected from the group consisting of aliphatic $C_1$ to $C_{24}$ alcohols, monoglyme, diglyme, 1,4-dioxane, furan, polypropylene glycol (PPG) homopolymers, polypropyleneglycol (PPG) copolymers and mixtures of two or more thereof.

For completeness, it is noted that these conditions i) to iii) are not mutually exclusive and a double metal cyanide catalyst for use in the present invention may meet any permutation of these conditions. In particular, the double metal cyanide complex [DMCC] may meet two or desirably three of the aforementioned conditions i) to iii).

The alcohol of these embodiments (L, $L^1$, $L^2$) may either be a saturated or an unsaturated alcohol, the latter "unsaturated alcohol" term encompassing alcohols having: one or more double bond; one or more triple bond; or, a combination of double and triple bonds. Herein, the alcohol (L, $L^1$, $L^2$) desirably contains from 2 to 12 carbon atoms and more particularly from 2 to 10 carbon atoms.

The polypropylene glycol (PPG) homopolymers and polypropylene glycol (PPG) copolymers are desirably characterized by a weight average molecular weight (Mw) of from 500 to 2000. As an alternative or supplementary characterization to this molecular weight limitation, said polypropylene glycol (PPG) copolymers should desirably be either block or random copolymers of ethylene oxide and propylene oxide: exemplary commercial block copolymers include those manufactured under the Pluronics® trade name by BASF.

In accordance with the preferred defined conditions, an exemplary double metal cyanide complex [DMCC] of Formula (III-A) may meet at least one of the following conditions:

i) $M^1$ is equal to $M^3$;

ii) X is an anion selected from the group consisting of halide, hydroxide, sulphate, carbonate, cyanide, thiocyanide, carboxylate, nitrate, borate and antimonite; and, iii) L is selected from the group consisting of ethanol, i-propyl alcohol, n-butyl alcohol, i-butyl alcohol, sec-butyl alcohol, tert-butyl alcohol, n-octanol, n-decanol, n-dodecanol, 2-octyldodecanol, undecen-1-ol, polypropyleneglycol (PPG) homopolymers, polypropyleneglycol (PPG) copolymers and mixtures of two or more thereof; wherein said polypropylene glycol homo- or copolymers are characterized by a weight average molecular weight (Mw) of from 500 to 2000.

A particular preference may also be acknowledged for double metal cyanide complex [DMCC] of Formula (III-A) in which: (iii) L is tert-butyl alcohol or a polypropyleneglycol (PPG) homopolymer having a weight average molecular weight (Mw) of from 500 to 2000, more preferably tert-butyl alcohol. Additionally or independently, a preference may also be acknowledged for double metal cyanide complexes of Formula (III-A) which meet at least one of the following conditions: i) $M^1$ is equal to $M^3$ and is Zn; $M^2$ is Co; and, ii) X is a halide.

In accordance with the preferred defined conditions, an exemplary double metal cyanide complex [DMCC] of Formula (III) may meet at least one of the following conditions:

iv) $M^1$ is equal to $M^3$;

v) X is an anion selected from the group consisting of halide, hydroxide, sulphate, carbonate, cyanide, thiocyanide, carboxylate, nitrate, borate and antimonite; and, vi) $L^1$ and $L^2$ are independently selected from the group consisting of ethanol, i-propyl alcohol, n-butyl alcohol, i-butyl alcohol, sec-butyl alcohol, tert-butyl alcohol, n-octanol, n-decanol, n-dodecanol, 2-octyldodecanol, undecen-1-ol, polypropyleneglycol (PPG) homopolymers, polypropyleneglycol (PPG) copolymers and mixtures of two or more thereof; wherein said polypropylene glycol homo- or copolymers are characterized by a weight average molecular weight (Mw) of from 500 to 2000.

A particular preference may also be acknowledged for double metal cyanide complex [DMCC] of Formula (III) in which: (iii) $L^1$ is tert-butyl alcohol; and, $L^2$ is n-octanol, n-decanol, n-dodecanol, 2-octyldodecanol, undecen-1-ol or a polypropyleneglycol (PPG) homopolymer having a weight average molecular weight (Mw) of from 500 to 2000. Additionally or independently, a preference may also be acknowledged for double metal cyanide complexes of Formula (III) which meet at least one of the following conditions: i) $M^1$ is equal to $M^3$ and is Zn; $M^2$ is Co; and, ii) X is a halide.

In this synthesis step b), the amount of DMC catalyst employed should be sufficient to provide a reasonable polymerization rate but it should be minded such catalysts are expensive and using lower amounts thereof can obviate the need to remove catalyst residues from the product. Without intention to limit the present invention, effective polymerizations have been conducted where the amount of DMC catalyst is from 10 ppm to 5000 ppm, in particular from 50 to 500 ppm, based on the weight of the co-polymer product.

As described herein above, the alkylene oxide employed in this synthesis step will conform to Formula (II):

Formula (II)

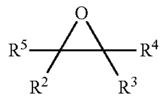

wherein $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen. It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Thus suitable alkylene oxide reactants include one or more of: propylene oxide; 1,2-butylene oxide; cis-2,3-epoxybutane; trans-2,3-epoxybutane; 1,2-epoxypentane; 1,2-epoxyhexane; decene oxide; and, styrene oxide. And particular preference is given to using propylene oxide.

For completeness, it is noted that the alkylene oxide to be polymerized may be the same or different from any alkylene oxide which may be used in the synthesis of the initiator compound of Formula (IA) as described herein above.

Whilst it is does not represent a preferred embodiment, the present invention does not preclude the alkylene oxide monomer(s) being co-polymerized with one or more cyclic monomers selected from the group consisting of: oxetanes; cyclic anhydrides; and, lactones. However, such cyclic co-monomers should constitute less than 10 wt. %, preferably less than 5 wt. %, based on the total weight of the monomers.

Process Conditions

Whilst there is certainly no intention to preclude either batch-wise or continuous performance of the polymerization, the polymerization reaction of this synthesis step is most suitably performed as a semi-batch process.

The polymerization reaction can be performed in any type of vessel that is suitable for the pressures and temperatures described below. In the preferred semi-batch process, the vessel should have one or more inlets through which at least the alkylene oxide monomer(s) can be introduced during the reaction. In the less desired continuous process, a reactor vessel should contain at least one outlet through which a portion of the partially polymerized reaction mixture could be withdrawn. That aside, exemplary vessels for continuous or semi-batch operations include but are not limited to: tubular reactors; loop reactors; and, continuous stirred tank reactors (CTSR). Any reactor should, of course, be equipped with a means for providing or removing heat so that the temperature of the polymerization mixture can be maintained within the desired range: there is no intention to limit such means but examples include jacketing for thermal fluids and internal and/or external heaters.

In the preferred semi-batch process, the DMC catalyst complex and the initiator—corresponding to Formula (I) or, preferably Formula (IA)—are first combined: that mixture then preferably undergoes a preliminary heating step, in the absence of alkylene oxide, at a temperature of from 50 to 220° C., for instance from 75 to 180° C. That preliminary heating step is conducted in an inert atmosphere and is typically but, not necessarily, conducted under sub-atmospheric pressure. The preliminary heating is, moreover, usually conducted for a period of at least 10 minutes: a period of from 10 to 30 minutes might be mentioned for illustrative purposes.

After this preliminary heating, the temperature of the vessel is, if necessary, adjusted to the polymerization temperature and a portion of the alkylene oxide is introduced. When the DMC catalyst complex has become activated—typically indicated by a drop of internal reactor pressure—further alkylene oxide is fed into the reactor under the polymerization conditions.

The polymerization temperature is typically at least 80° C. and preferably at least 100° C. Whilst the reaction temperature may be 200° C. or higher, it is preferred that the temperature does not exceed 190° C. or even 180° C. in order inter alia: to maintain workable reactor pressures; to minimize the formation of volatile impurities or other by-products; and, to maintain adequate catalyst activity without deactivating or decomposing the DMC catalyst.

The process pressure is not critical: as such, the polymerization reaction can be run at sub-atmospheric, atmospheric, or super-atmospheric pressures but pressures at or slightly above atmospheric pressure are preferred.

Importantly, the polymerization reaction should be performed under anhydrous conditions and in the absence of any compound having an active hydrogen atom. Exposure to atmospheric moisture may be avoided by providing the reaction vessel with an inert, dry gaseous blanket. Whilst dry nitrogen, helium and argon may be used as blanket gases, precaution should be used when common nitrogen gases are used as a blanket, because such nitrogen may not be dry enough on account of its susceptibility to moisture entrainment; the nitrogen may require an additional drying step before use herein.

The alkylene oxide may be fed to the reaction vessel on demand by continuously pressurizing the reactor with the alkylene oxide to a predetermined internal reactor pressure. During the alkylene oxide feed stage, the concentration of un-reacted alkylene oxide in a semi-batch reactor should desirably be maintained at a level of from 0.01 to 10 wt. % or from 0.1% to 5 wt. %, based on the weight of the polymerization mixture. The alkylene oxide feed is then continued until enough has been introduced to enable the target product molecular weight to be attained. After the alkylene oxide feed is completed, the reaction mixture may be maintained at the polymerization temperature to promote the consumption of any remaining alkylene oxide.

Whilst additional DMC catalyst may certainly be added during the course of the alkylene oxide addition, it is conventional in a semi-batch process for the entire amount of initiator to be added at the start of the process.

The copolymer product obtained in this synthesis step will commonly contain in toto up to 1% by weight, based on the weight of said product, of: un-reacted alkylene oxide; the initiator compound; organic impurities; and, water. Volatile impurities and moisture should be flashed or stripped from the copolymer product. The copolymer product also contains catalyst residues: whilst it is typical to leave these residues in the product, they may be removed if desired.

The hydroxyl-functionalized polyether-polysiloxane block copolymers derived in this synthesis step may possess a nominal hydroxyl functionality equal to the average number of hydroxyl groups per molecule of the initiator compound (Formula (I) or Formula (IA)). As is well known, the actual functionality of a copolymer—the actual average number of hydroxyl groups per molecule—will tend to be slightly lower than the nominal functionality due to side reactions that occur during the polymerization process.

The hydroxyl-functionalized polyether-polysiloxane block copolymers derived in this synthesis step may possess a number average molecular weight (Mn) of from 1000 to 60000 g/mol, preferably from 2000 to 40000 g/mol and more preferably from 10000 to 40000 g/mol. Moreover, the copolymers may be characterized by a polydispersity index (PDI) in the range from 1.0 to 1.5, preferably from 1.0 to 1.15.

In an alternative but not mutually exclusive characterization of this synthesis step, the polymerization reaction can be characterized by its "build ratio", this being the ratio of the number average molecular weight of the copolymer product to that of the initiator compound. Herein this build ratio may be as high as 150, but is more commonly in the range of from 5 to 50.

Compositions and Applications of the Hydroxyl-Functionalized Polyether-Polysiloxane Block Copolymers It is anticipated that the hydroxyl-functionalized polyether-polysiloxane block copolymers of the present invention per se may find utility as a curable, crosslinkable or otherwise reactive component of: a coating composition; a sealant composition; an adhesive composition, such as a pressure sensitive adhesive composition; or, a composition for additive manufacturing. Said compositions should comprise, in addition to the hydroxyl-functionalized polyether-polysiloxane block copolymers, at least one compound having at least one hydroxyl group-reactive functionality preferably selected from isocyanate groups, cyano groups, melamine groups, epoxy groups, acrylate groups, methacrylate groups, ester groups, carbonate groups, cyclocarbonate groups, carboxylic acid groups or anhydride groups.

The present invention also provides a silylated polymer based on the hydroxyl-functionalized polyether-polysiloxane block copolymers.

In a preferred embodiment of the present invention, the silylated polymer may be obtained by reacting (i.e., end-capping) the hydroxyl-functionalized polyether-polysiloxane block copolymer with isocyanatosilane and for the inclusion of said silylated polymer in a curable composition, such as a curable coating, sealant or adhesive composition. Commonly, to form a silylated prepolymer, the hydroxyl-functionalized polyether-polysiloxane block copolymer may be reacted with at least one isocyanatosilane of Formula (VII):

$$OCN—B—Si—(X)_m(R^{12})_{3-m} \qquad (VII)$$

wherein m is 0, 1 or 2, preferably 0 or 1; each $R^{12}$ is independently selected from a hydroxyl group, a $C_1$-$C_{10}$ alkoxy group, a $C_1$-$C_{10}$ acyloxy group, or —$OCH(R^{13})COOR^{14}$, wherein $R^{13}$ is selected from hydrogen or a $C_1$-$C_4$ alkyl group; and $R^{14}$ is selected from a $C_1$-$C_8$ alkyl group; each X is independently selected from a $C_1$-$C_8$ alkyl group which can optionally be interrupted by at least one heteroatom; and, B is selected from a $C_1$-$C_{20}$ alkylene group. Preferably each $R^{12}$ is independently selected from a $C_1$-$C_4$ alkoxy or acyloxy group and, more preferably, each $R^{12}$ is independently selected from a methoxy or ethoxy group.

As an exemplary, but non-limiting, list of compounds meeting Formula (VII), the following may be mentioned: 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanato-methyltrimethoxysilane, 3-isocyanatopropyltriethoxysilane, 2-isocyanato-2-methylethyl-triethoxysilane, 4-isocyanatobutyltriethoxy-silane, 2-isocyanato-1,1-dimethylethyl-triethoxysilane, 1-isocyanatomethyltriethoxysilane, 3-isocyanatopropylmethyldimethoxysilane, 3-isocyanatopropyldimethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane and 1-isocyanatomethylmethyldiethoxysilane. These compounds may be reacted with the hydroxyl-functionalized polyether-polysiloxane block copolymer either alone or in admixture.

The end-capping reaction may be performed under catalysis, with suitable catalysts being well-known to a person of ordinary skill in the art. In principle, any compound that can catalyze the reaction of a hydroxyl group and an isocyanato group to form a urethane bond can be used. And examples thereof include: tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters; dibutyltin bisacetylacetonate; titanates such as tetrabutyl titanate and tetrapropyl titanate; organoaluminum compounds such as aluminum trisacetylacetonate, aluminum trisethylacetoacetate, and diisopropoxyaluminumethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo-(5,4,0)-undecene-7 (DBU); aliphatic carboxylate salts or acetylacetonates of potassium, iron, indium, zinc, bismuth, or copper.

In another preferred embodiment, the silylated polymer may be obtained by reacting the hydroxyl-functionalized polyether-polysiloxane block copolymer with at least one polyisocyanate, preferably diisocyanate, with a stoichiometric excess of the NCO groups of the polyisocyanate with respect to the OH groups of the hydroxyl-functionalized polyether-polysiloxane block copolymer to form a NCO-terminated prepolymer; and reacting the NCO-terminated prepolymer with at least one silane having at least one NCO group-reactive functionality. Preferably the silane having at least one NCO group-reactive functionality conforms to Formula (VIII):

$$R^{15}R^{16}N—R^{17}—SiXYZ \quad \text{(VIII)}$$

wherein $R^{15}$ and $R^{16}$ are independently selected from hydrogen or a $C_1$-$C_8$ alkyl group; $R^{17}$ is a divalent hydrocarbon residue having 1 to 12 carbon atoms, optionally comprising at least one heteroatom, preferably N or O; and X, Y, Z are independently selected from a hydroxyl group, a $C_1$-$C_8$ alkyl group, a $C_1$-$C_8$ alkoxy group or a $C_1$-$C_8$ acyloxy group, at least one of the substituents X, Y, Z being selected from a $C_1$-$C_8$ alkoxy or a $C_1$-$C_8$ acyloxy group. The linking group $R^{17}$ can, for example, be a linear, branched or cyclic, substituted or unsubstituted alkylene residue. Nitrogen (N) or oxygen (O) may be contained therein as a heteroatom. If X, Y and/or Z are an acyloxy group, this can be, for example, the acetoxy group $—OCO—CH_3$.

The polyisocyanates suitable for preparing the NCO-terminated prepolymer include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

According to the invention, there is a stoichiometric excess of NCO groups of the polyisocyanates with respect to OH groups of the hydroxyl-functionalized polyether-polysiloxane block copolymer. The ratio of the number of OH groups of the hydroxyl-functionalized polyether-polysiloxane block copolymer to the number of NCO groups of the polyisocyanates is particularly preferably 1:3 to 1:1.1, in particular 1:2.5 to 1:1.5.

A curable composition, such as a coating, sealant or adhesive composition comprising either the hydroxyl-functionalized polyether-polysiloxane block copolymer or the silylated polymer(s) obtained therefrom will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are catalysts, plasticizers, stabilizers, antioxidants, fillers, reactive diluents, drying agents, adhesion promoters and UV stabilizers, fungicides, flame retardants, rheological adjuvants, color pigments or color pastes, and/or optionally also, to a small extent, solvents.

A "plasticizer" for the purposes of this invention is a substance that decreases the viscosity of the composition and thus facilitates its processability. Herein the plasticizer may constitute up to 40 wt. % or up to 20 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include sterically hindered phenols and/or thioethers and/or substituted benzotriazoles and/or amines of the hindered amine light stabilizer (HALS) type. It is preferred in the context of the present invention that a UV stabilizer that carries a silyl group—and becomes incorporated into the end product upon crosslinking or curing—be used: the products Lowilite™ 75, Lowilite™ 77 (Great Lakes, USA) are particularly suitable for this purpose. Benzotriazoles, benzophenones, benzoates, cyanoacrylates, acrylates, sterically hindered phenols, phosphorus and/or sulfur can also be added.

The curable compositions may further comprise up to 5 wt. %, for example from 0.01 to 3 wt. %, based on the total weight of the composition, of catalyst. The catalysts that can be used are all known compounds that can catalyze hydrolytic cleavage of the hydrolyzable groups of the silane groupings, as well as the subsequent condensation of the Si—OH group to yield siloxane groupings (crosslinking reaction and adhesion promotion function). Examples of catalysts, which can be used alone or in combination, include: titanates, such as tetrabutyl titanate and tetrapropyl titanate; tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides, such as dibutyltin oxide and dioctyltin oxide; reaction products between dibutyltin oxides and phthalic acid esters; dibutyltin bisacetylacetonate; organoaluminum compounds, such as aluminum trisacetylacetonate, aluminum trisethylacetoacetate, and diisopropoxyaluminum ethylacetoacetate; chelate compounds, such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole and 1,8-diazabicyclo-(5,4,0)-undecene-7 (DBU); a low-molecular-weight polyamide resin obtained from an excess of a polyamine and a polybasic acid; adducts of a polyamine in excess with an epoxy; and, silane adhesion promoters having amino groups, such as 3-aminopropyltrimethoxysilane and N-(β-aminoethyl)aminopropylmethyldimethoxysilane.

As noted, the curable compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 1 to 80 wt. %, and more preferably from 5 to 60 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPa·s, or even from 50,000 to 60,000 mPa·s.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 and 5 wt. %, based on the total weight of the composition.

All compounds that are miscible with the adhesive or sealant with a reduction in viscosity, and that possess at least one group that is reactive with the polymeric binder, can be used as reactive diluents. The following substances can be used, for example, as reactive diluents: polyalkylene glycols reacted with isocyanatosilanes (e.g. Synalox 100-50B, Dow); carbamatopropyltrimethoxysilane; alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (10

Trimethoxy), isooctyltriethoxysilane (10 Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also usable as reactive diluents are the following polymers of Kaneka Corp.: MS S203H, MS S303H, MS SAT 010, and MS SAX 350. Silane-modified polymers that are derived, for example, from the reaction of isocyanatosilane with Synalox (Dow) grades can likewise be used.

In the same manner, the silylated or end-capped polymers according to the present invention can be used in a mixture with usual polymers or pre-polymers known per se, optionally with concurrent use of the aforementioned reactive diluents, fillers, and further adjuvants and additives. "Usual polymers or pre-polymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. Also suitable as adhesion promoters, however, are so-called tackifying agents of which examples include: hydrocarbon resins; phenol resins; terpene-phenolic resins; resorcinol resins or derivatives thereof; modified or unmodified rosin acids or rosin esters (abietic acid derivatives); polyamines; polyaminoamides; anhydrides; and, anhydride-containing copolymers. The addition of polyepoxide resins in small quantities can also improve adhesion on many substrates: solid epoxy resins having a molecular weight of over 700, provided in finely ground form, are then preferably used for this. If tackifying agents are used as adhesion promoters, their nature and quantity depend on the adhesive/sealant composition and on the substrate onto which it is applied. Tackifying resins (tackifiers) such as, for example, terpene-phenolic resins or resin acid derivatives, may typically be used in concentrations of from 5 to 20 wt. %, based on the total weight of the composition; adhesion promoters, such as polyamines, polyaminoamides, phenolic resins or resorcinol derivatives may typically be used in an amount of from 0.1 to 10 wt. %, based on the total weight of the composition.

Various features and embodiments of the disclosure are described in the following examples, which are intended to be representative and not limiting.

EXAMPLES

Example 1: Preparation of 1-(allyloxy)propan-2-ol

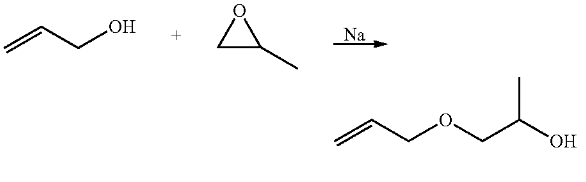

215.6 g (3.712 mol) of allyl alcohol was placed in a 1 litre (1 L) autoclave equipped with a dosage system. Under an argon flow, Na (0.08% mol.) was added into the vessel. The mixture was stirred at room temperature until the gas evolution ceased. The autoclave was then closed and heated to 110° C. In the next step, propylene oxide (PO, 173.2 ml) was dosed at a dosage rate of 1.25 g/m in).

After the completion of the addition of PO, the autoclave was allowed to cool to room temperature and the reaction mixture was stirred overnight. A yellow transparent mixture was obtained. That mixture was neutralized using HCl (37% solution in water) and dried with $MgSO_4$. The mixture was filtrated through celite and distilled under vacuum (50 mbar, 57-70° C.). The product was obtained at a good yield (80-86%) and the structure thereof was confirmed by NMR spectroscopy and mass spectrometry.

Example 2: Preparation of 1,3-(2'-Hydroxypropoxypropyl)-1,1,3,3-tetramethyldisiloxane

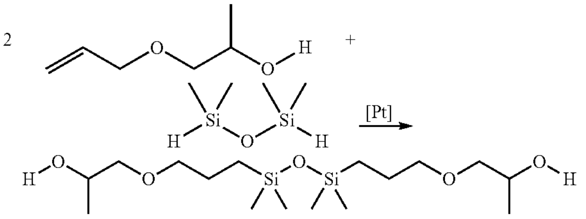

80.6 g of 1,1,3,3-tetramethyldisiloxane were dissolved in 600 mL of dry toluene, externally cooled with crushed ice to 10° C., and 400 mg of 5 wt. % platinum on carbon was added. 2-Hydroxy-propylallylether (139.4 g)—as obtained from Example 1—was added dropwise over a period of 30 minutes. The temperature of the reaction mixture was raised to 100° C. over a period of 5 hours and held at this temperature for a further 12 hours. The resultant mixture was finally refluxed for two hours. Then 250 mL of heptane and active charcoal were added and the mixture again warmed to reflux for 1.5 hours. After cooling, the solution was filtered through Silica/Diatomite and the solvent was stripped off under reduced pressure; the product was finally held at 50 mbar pressure and 90° C. for 12 hours to obtain 181.6 g of the desired product.

Example 3: Preparation of alpha-omega-(3-(2-hydroxypropoxy)propyl)-polydimethylsiloxane 800 g of octamethycylcotetrasiloxane (D4), 292 g of 1,3-(2'-Hydroxypropoxypropyl)-1,1,3,3-tetramethyl-disiloxane, as obtained from Example 2 above, and 400 μl of triflic acid were placed in a 2 liter reactor (SYSTAG FlexyPAT) equipped with an anchor agitator and heated at 90° C. for 2 hours under stirring. The mixture was quenched with 12.8 g of $NaHCO_3$ and stirred for 30 minutes at 90° C. At 3 bar pressure, the crude product was filtered through a PALL Filter EDF 14-2 with a filter insert Begerow BECO KD5. The residual D4 was removed in a thin film evaporator at 120° C. and 2 mbar (200 rpm/200 g/h).

The polymer obtained was analyzed by GPC analysis and found to have: a number average molecular weight (Mn) of 2109 g/mol; a weight average molecular weight (Mw) of 2787 g/mol; and, a Polydispersity Index of 1.32.

Example 4: Preparation of alpha-omega-(hydroxy)-polypropylenglycol-b-polydimethylsiloxane-b-polypropylene glycol ($M_n$~13000 g/mol)

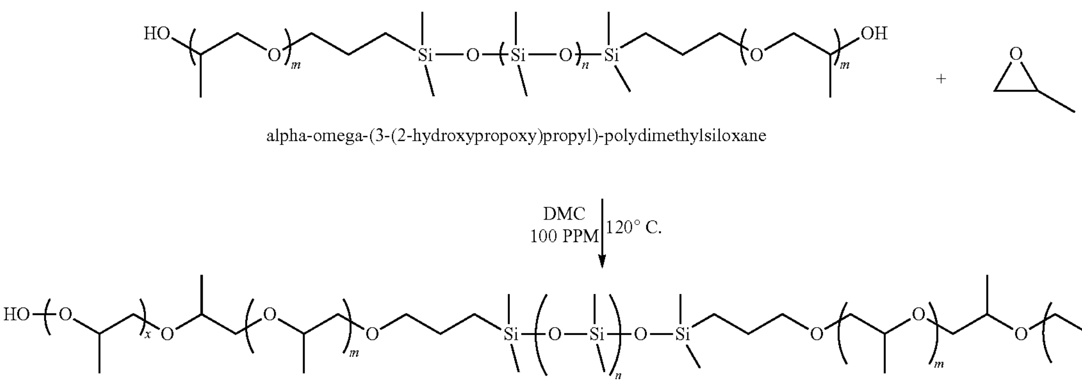

alpha-omega-(3-(2-hydroxypropoxy)propyl)-polydimethylsiloxane alpha-omega-(hydroxy)-polyproplenglycol-b-polydimethylsiloxiane-b-polypropylenglycol 40.0 g of alpha-omega-(3-(2-hydroxypropoxy)propyl)-polydimethylsiloxane ($M_w$: 2787 g/mol)—as obtained from Example 3—was charged in a 1 L-stirring Autoclave together with 0.023 g of the DMC catalyst (100 ppm, based on the amount of the block-copolymer). The reaction mixture was heated at 85° C. under constant stirring at 350 rpm: i) for 45 minutes under vacuum (0.001 bar); and, ii) for 20 minutes under an argon atmosphere (1 bar). The reaction temperature was then increased to 110° C., at which temperature 10 g of propylene oxide (PO) was added. The reaction mixture was stirred constantly at 500 rpm until the pressure in the reactor remained constant: at that point, the reaction temperature was increased and fixed at 120° C.

After achieving the set reaction temperature, a further 180 g of PO was added to the reaction mixture through continuous dosing with a constant flow rate of 30 g per hour. After finishing the PO dosing, the reaction mixture was maintained at the fixed temperature for a further one hour. The traces of un-reacted monomer were then removed from the system by applying a vacuum (0.001 bar) for 30 minutes.

The co-polymer product was obtained at a yield of 99%. A characterization of the product is provided in Table 1 herein below.

Example 5: Preparation of alpha-omega-(hydroxy)-polypropylenglycol-b-polydimethylsiloxane-b-polypropylenglycol ($M_n$~18000 g/mol)

40.0 g of alpha-omega-(3-(2-hydroxypropoxy)propyl)-polydimethylsiloxane (Mw: 2787 g/mol)—as obtained from Example 3—was charged in a 1 L—stirring Autoclave together with 0.028 g of the DMC catalyst (100 ppm based on the amount of the block-copolymer). The reaction mixture was heated at 85° C. under constant stirring at 350 rpm: i) for 45 minutes under vacuum (0.001 bar); and, ii) for 20 minutes under an argon atmosphere (1 bar). The reaction temperature was then increased to 110° C., at which temperature 10 g of propylene oxide (PO) was added. The reaction mixture was stirred constantly at 500 rpm until the pressure in the reactor remained constant: at that point, the reaction temperature was increased and fixed at 120° C.

After achieving the set reaction temperature, a further 230 g of PO was added to the reaction mixture through continuous dosing with a constant flow rate of 30 g per hour. After finishing the PO dosing, the reaction mixture was maintained at the fixed temperature for a further one hour. The traces of un-reacted monomer were then removed from the system by applying a vacuum (0.001 bar) for 30 minutes.

The co-polymer product was obtained at yield of 99%. A characterization of the product is provided in Table 1 herein below.

Example 6: Preparation of alpha-omega-(hydroxy)-polypropylenglycol-b-polydimethylsiloxane-b-polypropylene glycol ($M_n$~30000 g/mol)

40.0 g of alpha-omega-(3-(2-hydroxypropoxy)propyl)-polydimethylsiloxane (Mw: 2787 g/mol)—as obtained from Example 3—was charged in a 1 L-stirring Autoclave together with 0.033 g of the DMC catalyst (60 ppm based on the amount of the block-copolymer). The reaction mixture was heated at 85° C. under constant stirring at 350 rpm: i) for 45 minutes under vacuum (0.001 bar); and, ii) for 20 minutes under an argon atmosphere (1 bar). The reaction temperature was then increased to 110° C., at which temperature 10 g of propylene oxide (PO) was added. The reaction mixture was stirred constantly at 500 rpm until the pressure in the reactor remained constant: at that point, the reaction temperature was increased and fixed at 120° C.

After achieving the set reaction temperature, a further 500 g of PO was added to the reaction mixture through continuous dosing with a constant flow rate of 30 g per hour. After finishing the PO dosing, the reaction mixture was maintained at the fixed temperature for a further one hour. The traces of un-reacted monomer were then removed from the system by applying a vacuum (0.001 bar) for 30 minutes.

The co-polymer product was obtained at yield of 99%. A characterization of the product is provided in Table 1 herein below.

Where noted in Table 1: number (Mn) and weight (Mw) average molecular weight were determined by GPC at 40° C. in THF using polystyrene standards; and, OH number was determined in accordance with DIN 53240-2.

TABLE 1

| Example | PDMS wt. % | $M_n$ [g/mol] | $M_w$ [g/mol] | Polydispersity Index (PDI) | Viscosity [mPa · s] | OH [mg KOH/g] |
|---|---|---|---|---|---|---|
| 4 | 17.4 | 13274 | 14375 | 1.08 | 2760 | 10.04 |
| 5 | 14.2 | 18645 | 20410 | 1.09 | 5980 | 7.47 |
| 6 | 7.3 | 30735 | 33684 | 1.09 | 14800 | 6.08 |

It is further noted that the copolymers of Examples 4, 5 and 6 were each characterized by a terminal unsaturation of less than 0.03 meq/g as measured by ASTM D4671-05.

Comparative Example 1

Preparation of alpha-omega-(hydroxy)-polypropylenglycol-b-polydimethylsiloxane-b-polypropylenglycol (Mw~2500 g/Mol) Via Hydrosilylation

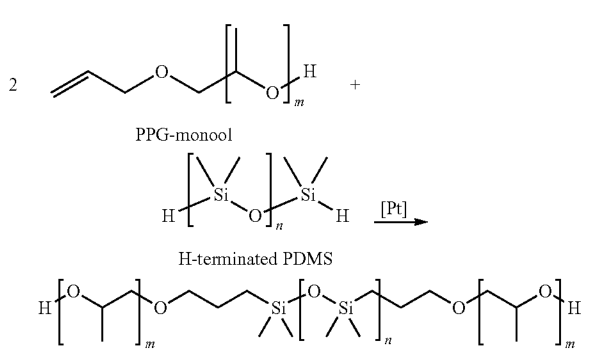

2 PPG-monool + H-terminated PDMS → PPG-b-PDMS-b-PPG diol

In a 50 ml two-neck round bottom flask equipped with a stirrer and connected to a reflux condenser, 5.0 g (3.29 mol.) of a polypropyleneglycol-monool (Mw~1500 g/mol) and 16.0 mg of Pt supported on charcoal (10% of Pt in the catalyst, 0.25% mol. in the mixture) were mixed in 4 ml of toluene under an argon atmosphere.

The mixture was stirred for a while and then H-terminated PDMS (Mw~500 g/mol) was added (0.6 ml, 0.00164 mol.) into the reactor at room temperature. The mixture was stirred and refluxed (oil bath temperature, 120° C.) under an inert atmosphere (Ar) until complete conversion of the Si—H groups was achieved: the progress of the reaction was followed by $^1$H-NMR. The catalyst was separated by filtration after the reaction.

The crude product was obtained as a colorless, stable microemulsion that that did not show coalescence after standing for several weeks at room temperature. GPC analysis of the product showed a bimodal curve attributed to the incomplete (c. 60%) conversion of the reactants.

In view of the foregoing description and examples, it will be apparent to those skilled in the art that equivalent modifications thereof can be made without departing from the scope of the claims.

The invention claimed is:

1. A method for producing a hydroxyl-functionalized polyether-polysiloxane block copolymer, said method comprising the steps of:

providing a compound having the general Formula (IA)

Formula (IA)

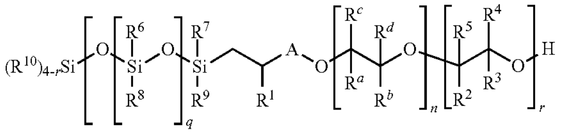

wherein:

q is an integer of from 5 to 250;

r is an integer from 2 to 4;

n is 0;

m is 1;

$R^1$ is selected from hydrogen and a $C_1$-$C_6$ alkyl group;

A denotes a spacer group comprising a covalent bond or a $C_1$-$C_{12}$ alkylene group;

$R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that $R^2$, R3, and $R^5$ are hydrogen and $R^4$ is either a phenyl group or a $C_1$-$C_8$ alkyl group; and $R^6$, $R^7$, $R^8$, $R^9$, and $R^{10}$ may be the same or different and each is independently selected from a hydrogen atom, a $C_1$-$C_8$ alkyl group, a $C_3$-$C_{10}$ cycloalkyl group, a $C_6$-$C_{18}$ aryl group or a $C_6$-$C_{18}$ aralkyl group;

providing a double metal cyanide complex catalyst;

preheating a mixture of the compound and the double metal cyanide complex catalyst to a first temperature and maintaining the first temperature for a period of time;

providing at least one alkylene oxide monomer having the general Formula (II):

Formula (II)

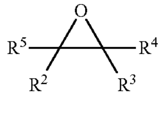

wherein:

$R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen; and performing a ring opening polymerization of the at least one alkylene oxide monomer of general Formula (II) in the presence of the compound of Formula (IA) and the double metal cyanide complex catalyst to provide the hydroxyl-functionalized polyether-polysiloxane block copolymer, wherein providing the at least one alkylene oxide monomer is a semi-batch process that comprises:

1) heating the mixture of the compound and the double cyanide complex catalyst to a second temperature higher than the first temperature;
2) adding a first portion of the at least one alkylene oxide monomer to the mixture of the compound and the double metal cyanide complex catalyst at the second temperature; and
3) after activation of the double metal cyanide complex catalyst as indicated by an equilibrium pressure in the semi-batch process, continuously dosing the mixture with a second portion of the at least one alkylene oxide monomer.

2. The method according to claim 1, wherein in Formula (II), $R^{2,}$ $R^3$ and $R^5$ are hydrogen; and $R^4$ is either a phenyl group or a $C_1$-$C_8$ alkyl group.

3. The method according to claim 1, wherein the double metal cyanide complex catalyst [DMCC] is represented either by the general Formula (III-A)

$$M_d^1\left[M^2(CN)_e\right]_f * xM^3(X)_g * y\mathrm{H_2O} * \omega L;\text{ or} \quad \text{(III-A)}$$

by general Formula (III):

$$M_d^1\left[M^2(CN)_e\right]_f * xM^3(X)_g * y\mathrm{H_2O} * zL^1 * aL^2 \quad \text{(III)}$$

wherein:

$M^1$ is a Zn, Fe, Co, Ni, Mn, Cu, Sn or Pb ion;

$M^2$ is a Fe, Co, Mn, Cr, Ir, Rh, Ru or V ion;

$M^3$ is a Zn, Fe, Co, Ni, Mn, Cu, Sn, Pb, Cr, Ir, Rh, Ru or V ion;

X is an anion;

L is an organic complexing agent;

$L^1$ and $L^2$ are distinct from one another and represent respectively first and second organic complexing agents;

d, e, f and g are each integers>0 but have values such that the complex $M^1_d[M^2(CN)_e]_f*xM^3(X)_g$ is electrically neutral;

$0.1 \leq x \leq 5$;

$0.1 \leq y \leq 1$;

$0.0001 \leq \omega \leq 6$;

$0.0001 \leq z \leq 1$; and $0.0001 \leq a \leq 5$.

4. The method according to claim 3, wherein said double metal cyanide complex catalyst is represented either by the general Formula (III-A) or by general Formula (III) and further meets at least one of the following conditions:

i) $M^1$ is equal to $M^{3}$;

ii) X is an anion selected from the group consisting of halide, hydroxide, sulphate, carbonate, cyanide, thiocyanide, carboxylate, nitrate, borate and antimonite; and/or iii) the (L) or each ($L^1$, $L^2$) organic complex agent is independently selected from the group consisting of aliphatic $C_1$ to $C_{24}$ alcohol, monoglyme, diglyme, 1,4-dioxane, furan, polypropyleneglycol (PPG) homopolymer, polypropyleneglycol (PPG) copolymer and mixtures of two or more thereof.

5. The method according to claim 1, wherein in Formula (IA) each of $R^{6,}$ $R^{7,}$ $R^{8,}$ $R^9$ and $R^{10}$ are independently selected from methyl and phenyl groups.

6. The method of claim 1, wherein the hydroxyl-functionalized polyether-polysiloxane block copolymer has a number average molecular weight of from 1,000 to 60,000 g/mol.

7. The method of claim 1, wherein the hydroxyl-functionalized polyether-polysiloxane block copolymer has a number average molecular weight of from 2,000 to 40,000 g/mol.

8. The method of claim 1, wherein the hydroxyl-functionalized polyether-polysiloxane block copolymer has a number average molecular weight of from 10,000 to 40,000 g/mol.

9. The method of claim 1, wherein providing the at least one alkylene oxide monomer further comprises:

after adding the first portion of the at least one alkylene oxide monomer to the mixture of the compound and the double metal cyanide complex catalyst at the second temperature, heating the mixture to a third temperature higher than the second temperature; and after activation of the double metal cyanide complex catalyst as indicated by the equilibrium pressure in the semi-batch process, continuously dosing the mixture with the second portion of the at least one alkylene oxide monomer at the third temperature.

10. The method of claim 1, wherein the first temperature is from 50 to 220° C.

11. The method of claim 1, wherein the period of time is at least 10 minutes.

12. The method of claim 1, wherein the second temperature is at least 100° C.

* * * * *